(12) United States Patent
Stilwell

(10) Patent No.: US 7,133,528 B2
(45) Date of Patent: Nov. 7, 2006

(54) CALL DEVICE

(76) Inventor: Dennis D. Stilwell, 4705 Indian Valley NW., Willis, VA (US) 24380

( * ) Notice: Subject to any disclaimer, the term of this patent is extended or adjusted under 35 U.S.C. 154(b) by 665 days.

(21) Appl. No.: 10/428,786

(22) Filed: May 5, 2003

(65) Prior Publication Data
US 2004/0223625 A1    Nov. 11, 2004

(51) Int. Cl.
*H03G 3/00*    (2006.01)
(52) U.S. Cl. .................. 381/61; 381/124; 446/397; 367/139; 700/94
(58) Field of Classification Search ............... 381/61, 381/124; 446/397, 297; 700/94; 119/174, 119/709; 367/139
See application file for complete search history.

(56) References Cited

U.S. PATENT DOCUMENTS

| | | | |
|---|---|---|---|
| 3,716,943 A | 2/1973 | Orzetti | |
| 4,562,590 A | 12/1985 | DeLage | |
| 4,662,858 A | 5/1987 | Hall | |
| 4,664,641 A | 5/1987 | Hearn et al. | |
| 4,807,051 A | 2/1989 | Ogura | |
| 4,810,997 A | 3/1989 | Kudo et al. | |
| 4,819,101 A | 4/1989 | Lemelson | |
| 4,932,920 A | 6/1990 | Hearn | |
| 4,944,704 A | 7/1990 | Grace | |
| 4,973,941 A | 11/1990 | Davis et al. | |
| 5,049,107 A | 9/1991 | De Nittis | |
| 5,059,126 A | 10/1991 | Kimball | |
| 5,125,866 A | 6/1992 | Arad et al. | |
| 5,145,447 A | 9/1992 | Goldfarb | |
| 5,146,353 A | 9/1992 | Isoguchi et al. | |
| 5,239,587 A | 8/1993 | Muckelrath | |
| 5,349,774 A | 9/1994 | Parra | |
| 5,376,038 A | 12/1994 | Arad et al. | |
| 5,529,526 A | 6/1996 | Wesley | |
| 5,531,600 A | 7/1996 | Baer et al. | |
| 5,562,521 A | 10/1996 | Butler et al. | |
| 5,802,197 A | 9/1998 | Fulcher | |
| 6,359,549 B1 * | 3/2002 | Lau et al. | 381/61 |
| 6,414,906 B1 * | 7/2002 | Gaspari | 367/139 |
| 6,757,574 B1 * | 6/2004 | Gardner et al. | 381/124 |

OTHER PUBLICATIONS

E-mail from Dennis Stilwell to Kathy Quinlan (Mar. 31, 2002) and e-mail from Kathy Quinlan to Dennis Stilwell (Apr. 2, 2002).

(Continued)

*Primary Examiner*—Brian T. Pendleton
(74) *Attorney, Agent, or Firm*—Stevens, Davis, Miller & Mosher, LLP

(57) ABSTRACT

An electronic animal lure for generating an animal call pattern by combining actual stored analog animal sounds with a micro controller. The animal sounds are stored in an analog storage device. A micro controller selects and addresses one of the pre-stored sounds then generates the signals to cause the storage device to play back the sound. The micro controller then selects a period of time delay before selecting and addressing the next sound to be played. Both time delays and sound selections are accomplished by use of an algorithm stored in the micro controller. The algorithm uses an onboard timer counter to generate a random number that is placed in a software counter causing the software counter to cycle for a period of time, creating a constantly varying time period between animal calling sounds. The algorithm also uses the onboard timer counter to select one of the stored sounds.

17 Claims, 4 Drawing Sheets

OTHER PUBLICATIONS

E-mail from Dennis Stilwell to Kathy Quinlan (Apr. 24, 2002).
Invoice from Krause Publications for advertisement in Jun.-Jul. 2002 issue of *The Trapper & Predator Caller* magazine (May 13, 2002).

Advertisement from Jun.-Jul. 2002 issue of *The Trapper & Predator Caller* (May 13, 2002).

* cited by examiner

CALL DEVICE

FIELD OF THE INVENTION

This invention relates to call device that emits a randomly selected series of sounds with random delays between the sounds and random delays between the series of sounds. The call device is placed in a location distant from the user to attract animals.

BACKGROUND OF THE INVENTION

There are various recording and playback devices that are well known. More particularly, there are several devices for playing back wildlife sounds in wildlife areas designed to attract animals. For example, in U.S. Pat. No. 5,802,197, issued to Fulcher, which is incorporated by reference in its entirety, there is described an audio decoy which uses predetermined sounds digitally recorded within a portable electronic device. The device plays back wildlife sounds in order to lure the wildlife sounds into close proximity with a photographer or hunter. The user of the device presses a portion of the device in order to activate the device to play a predetermined sound.

A problem with this device and other similar devices is that the sounds to be created are a predetermined sound routine, which is stored digitally on a chip or tape, or is recorded onto cassette tape or a compact disk. The sounds of the animals are recorded with silence between the sounds, taking up a lot of storage space.

Further, such a device plays a preset, prerecorded sound. It cannot alter the sound, play random sound sequences or random delays between sequences. The predetermined sound is static, which can be insufficient to attract animals.

Other devices for creating animal sounds to lure animals near devices that must be activated directly by the user by manipulating the device, such as U.S. Pat. No. 4,662,858, issued to Hall, or U.S. Pat. No. 3,716,943, issued to Orzetti, both of which are incorporated by reference herein in their entirety. The devices use friction to generate a turkey or squirrel call. Other devices require the user to blow directly into the call device, such as the popular duck call or a moose whistle.

Problems with these devices is that the sound, which may be realistic to humans, is not authentic and may not attract animals. Additionally, a user, in order to create a diversity of sounds, would have to carry several different devices and interchange the devices constantly to create a diverse sound sequence. Furthermore, all of the above devices require interaction by the user, the user cannot simply place the call in a location and back off and watch the animal approach the device.

SUMMARY OF THE INVENTION

It is thus an object of this invention to overcome the problems with these prior art devices. It is a further object of this invention to create a call device that can record several animal sounds in a relative small storage area, can play the sounds in random patterns to attract the attention of animals, and place these desired features in a compact unit. It is still a further object to provide a call device, that once activated, can be placed remote from the user so the user can canvas the entire area surrounding the call device.

These and other objects are carried out and the aforementioned problems are overcome with the present invention. The automated animal call according to this invention is an electronic animal call designed to generate a realistic animal calling pattern by combining actual stored analog animal sounds with a micro controller. The animal sounds are stored in the ISD series of chips from Winbond Electronics Corporation America of San Jose, Calif. The ISD series uses "DAST"(Direct Analog Storage Technology). DAST allows for longer periods of sound to be stored with less memory than digital techniques, providing an economical alternative to digital/analog conversion. In the ISD series of chips, sounds can be individually addressed. The micro controller selects and addresses one of the pre-stored sounds then generates the signals to cause the ISD sound chip to play back the sound. The micro controller also determines how many times the addressed sound will repeat and how much time between repeats. The micro controller then selects a period of time delay before selecting and addressing the next sound to be played by the ISD sound chip.

Time delays, pre-stored sounds, and number of times a sound repeats per calling sequence are accomplished by use of an algorithm stored in the micro controller. The algorithm uses the PIC micro controller's onboard timer counter module configured as a counter to generate a random number that is placed in a software counter causing the software counter to cycle for a period of time, creating a constantly varying time delay period between animal calling sounds. The algorithm also uses the PIC micro controller's onboard timer counter to determine which one of the pre-stored sounds to be played and the number of times the pre-stored sound repeats. As well as timing between repeated sounds.

Unlike other pre-recorded animal calls such as cassette tapes or compact disk (CD's), which can only play back their recorded pattern in their recorded sequence, this combination of randomly selected pre-stored sounds and randomly varying the number of times the sound repeats and also randomly varying timing between sounds (creating a calling sequence) then again randomly varying the timing between these calling sequences allowing for an animal call that constantly changes its call pattern, creating a more realistic call pattern similar to animals since animals vary their call patterns naturally.

It is unlike other pre-recorded animal calls, such as cassette tapes or compact disks, which also store the silence between calls. Since the automated animal call generates its own pattern of silence by use of time delays, only the sound needs to be store allowing for less memory and a more economical call.

Unlike other electronic calls which require human intervention such as pressing a button to cause a sound to be played back, the automated call according to this invention, once turned on, will randomly generate its own calling pattern allowing the unit to be placed away from the hunter/photographer, making it a more effective call. An optional rotary selector switch and mode switch can also be added to allow manual control of the sounds.

BRIEF DESCRIPTION OF THE DRAWINGS

The invention will be described in detail in reference to several drawings, in which.

DETAIL DESCRIPTION OF THE INVENTION

Figure 1:
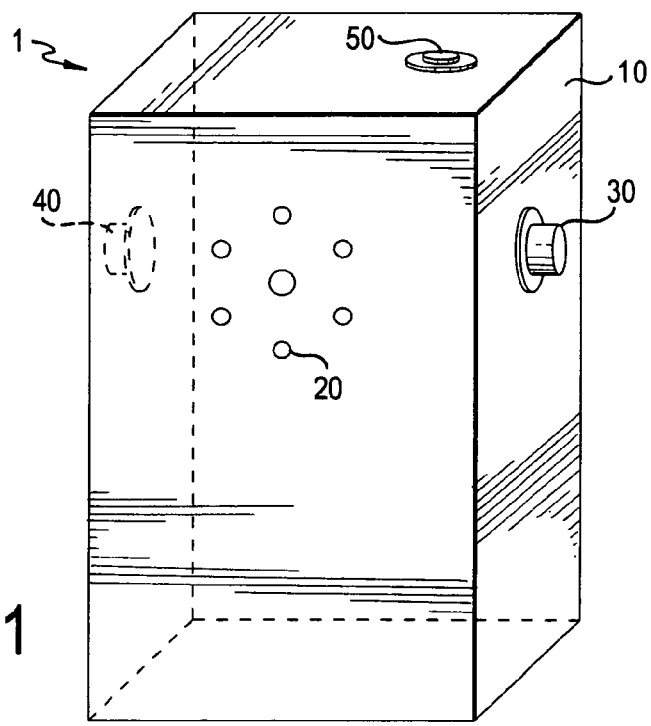
FIG. 1 is a front perspective view of the call device according to a first embodiment of the invention.
Figure 2:
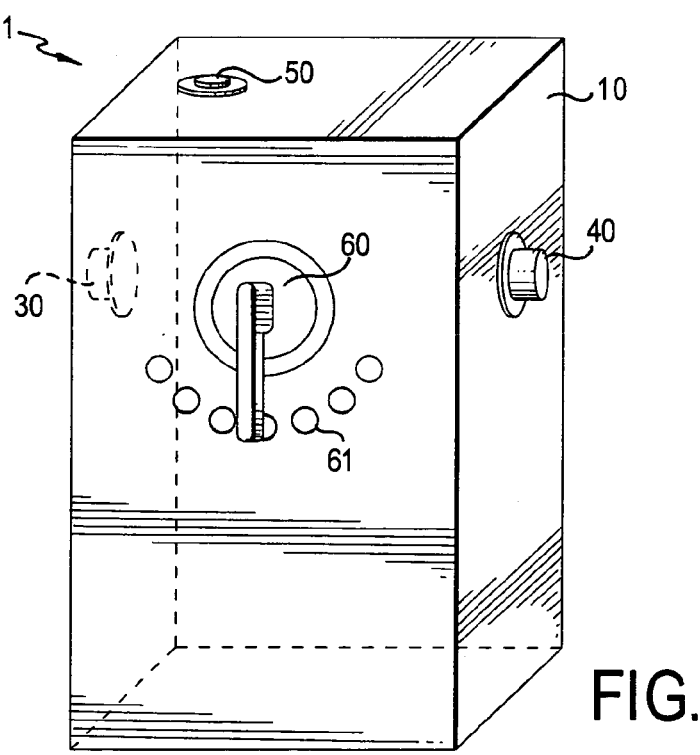
FIG. 2 is a rear perspective view of the call device shown in FIG. 1.

A call device according to a first embodiment is shown in FIGS. 1 and 2. Call device 1 has a casing 10 surrounding its several inner components. The casing in this example is a rectangular box shape. On a front surface of casing 10 are a series of perforations 20 that allow sound from a speaker located with in the casing to emit call sounds. On a side surface of casing 10 is a power switch 30 to turn the call device on and off. On an opposite side surface is a mode selection switch 40 two switch the device from a manual mode to an automatic mode. On an upper surface is a mono jack 50 to allow for an external speaker/amplifier.

The rear side of call device 1, shown in FIG. 2, has a mode selector switch 60, which rotates to allow for selection between sounds. Each sound is assigned a different rotational position on switch 60 so that movement of the switch to such location allows for the corresponding sound to be produced upon depression of the mode selection switch 40 in a manual mode for call device 1. As shown, a series of dots on the rear surface of casing 10 represent different animals or sounds. A user of call device 1 will align a pointer on switch 60 with a respective dot 61 to produce a sound corresponding to the dot. In an automatic mode of call device 1, movement of switch 60 to a particular location and/or alignment of dots allows for selection of a particular animal for sound reproduction of a group of sounds from that animal or selection of a group of other predetermined sounds.

Figure 3:
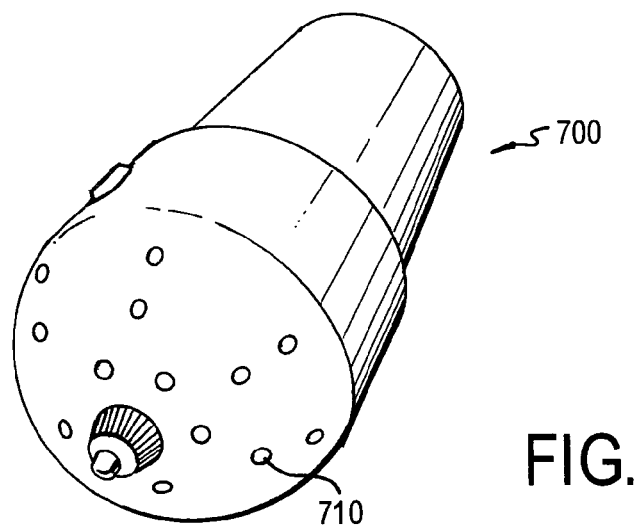
FIG. 3 is a perspective view of a call device according to another embodiment of the invention.

While, a rotational switch is used in this example, other switching devices are possible which allow for selecting the different circuits relating to different animals or particular sounds. Furthermore, the device need not have a rectangular shape as shown in the figures, the device may have a cylindrical shape, a more flattened shape, or any other shape that can contain the electrical components hereinafter described. An example of such an alternative embodiment is the call device 700 shown in FIG. 3, which illustrates a small tubular shaped housing, with a plurality of perforations 710 covering a speaker thereunder on an end surface thereof. In the other aspects, its operation is similar to the call device shown in FIGS. 1 and 2.

Figure 4:
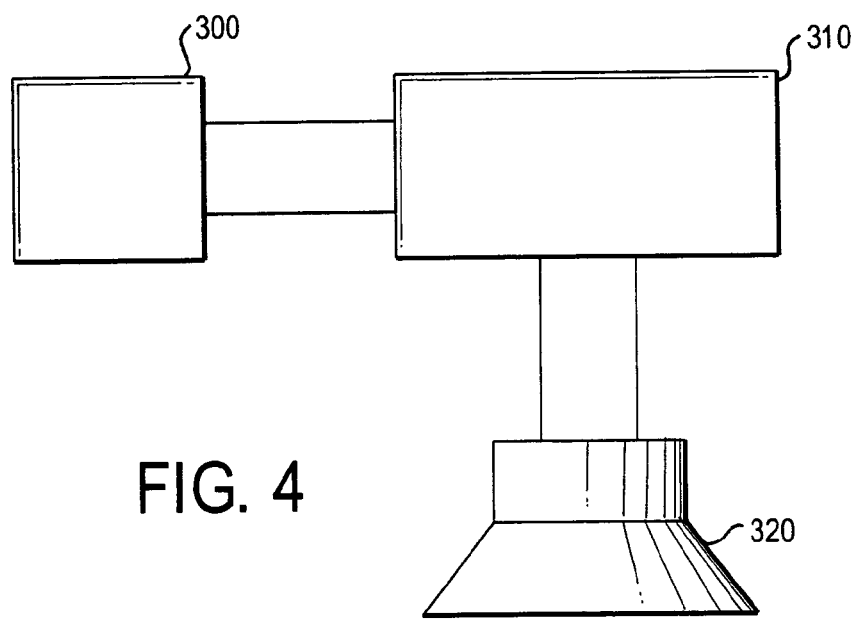
FIG. 4 is an operational view of the major component of a call device according to the invention.

The main portion of the internal circuit is shown in FIG. 4. A microcontroller 300 is connected to an analog storage device 310. Attached to the analog storage device is a speaker 320 which emits the call sounds. Structurally, speaker 320 is located beneath perforations 20, as noted above. A power system (not shown) provides the power to the system to perform the appropriate functions.

Storage device 310 in call device 1 is an analog storage device. The call sounds are stored directly into the memory of storage device 310 in their natural form, providing call reproductions without taking up storage space and allows for the sounds to be individually addressed. An example of such a device is an ISD1400 Series single-chip voice record/playback device, sold under the mark CHIPCORDER, by Winbond Electronics Corporation America of San Jose, Calif. While an analog storage device is used in this example, other storage devices, including digital, may be used where more storage space is available.

A multitude of sounds can be recorded within storage device 310. In the particular application of the call device disclosed herein, the sounds relate to animal calls. For example in a call for a deer to attract other deer, there are three general sounds of note, a grunt, a doe estrus beat and a snort. Other sounds for a deer may be possible as well. Further, other animals may be used, each having a plurality of sounds, such as a turkey, rabbit, etc. Each sound is recorded in a particular location in the storage device and the sounds are divided up by animal type, for example, deer may have three sounds, a turkey may have two sounds, rabbit one, etc. Thus, either one or a plurality of sounds may be recorded in the call device, relating to one or more animals. A specific example of sounds can be animal distress sounds in a situation in which the call device is used as a predator lure.

Micro-controller 300 in call device 1 is a processor for controlling when storage device 310 will play a sound based on the animal mode selected. Micro-controller 300 selects and addresses one of the pre-stored sounds and generates a signal to cause storage device 310 to play back the sound through speaker 320 when either in the manual or the automatic mode. In the automatic mode, based on a control process pre-programmed within, micro-controller 300 determines how many times the addressed sound will repeat and how much time between repeats, and will then select a period of time of delay before selecting and addressing the next sound to be played.

Call device 1 can be operated in either the manual mode or the automatic mode. The manual mode works by rotating switch 60 to a position indicating a desired sound and then depressing and releasing mode switch 40. Micro-controller 300 will then produce a signal to storage device 310 to produce the desired sound. Call device 1 will emit the desired sound each time mode switch 40 is depressed.

In the automatic operation of call device 1, the user rotates switch 60 to a desired sounds color dot representing a sound grouping or a desired animal. The particular color dot in this example represents three sounds, for example, deer sounds representing a grunt, a doe estrus beat and a snort. The user will then depress mode switch 40 for a period of approximately 6–8 seconds. When the call device emits a pair of sound bursts from the selected sound group, the user is notified the call device is in the automatic mode. The user may then release mode switch 40 and micro-controller 300 takes over control of the operation of the call device. The user may then place the call device in a desired location remote from the user while the call device continuously produces the random pattern of deer grunts, doe estrus beats and snort and time delays therebetween.

Figure 5:
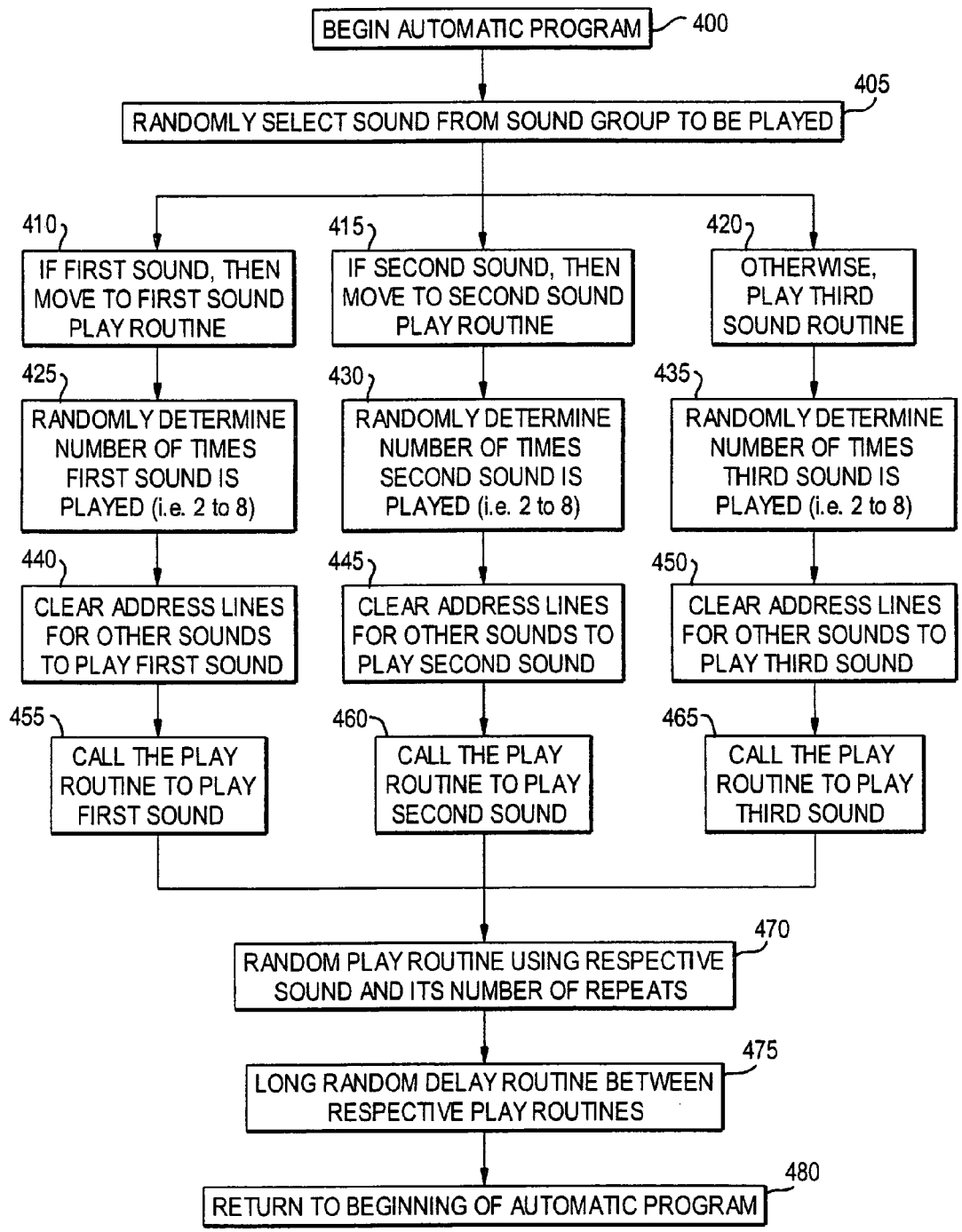
FIG. 5 is a flow diagram of an automatic program for playing sounds using the call device according to the invention.

The control process for the call device performed by micro-controller 300 operates using an algorithm to randomly select the pre-sorted sounds, the number of times the sounds repeats, the timing between sounds and the timing between a calling sequence for a particular sound. The control process is explained with reference to FIGS. 5–7. The pseudo-code with comments for the process is included in Appendix I.

The control process begins the automatic program at step 400. The micro-controller generates a random number from among 1, 2, and 3, which corresponds to the first sound, the second sound and the third sound, respectively, at step 405.

If the random number corresponds to the first sound, then the first sound play routine is selected and started, at step 410. Once the first sound play routine is begun, the micro-controller randomly selects a number of times the sound is repeated, for example, a number of times between 2 and 8, at step 425. The micro-controller then clears the address for the other sounds to prevent the storage device from playing the other sounds, allowing it to play only the first sound, at step 440. Then, the micro-controller calls up the play routine to play a routine using the first sound for the specified number of repeats, at step 455.

Similarly, if the random number corresponds to the second sound, then the second sound play routine is selected and started, at step 415. Once the second sound play routine is begun, the micro-controller randomly selects a number of times the second sound is repeated, for example, a number of times between 2 and 8, at step 430. The micro-controller then clears the address for the other sounds to prevent the storage device from playing the other sounds, allowing it to play only the second sound, at step 445. Then, the micro-controller calls up the play routine to play a routine using the second sound for the specified number of repeats, at step 460.

If the random number does not correspond to either the first or second sound, then the third sound play routine is selected and started, at step 420. Once the third sound play routine is begun, the micro-controller randomly selects the number of times the third sound is repeated, for example, a number of times between 2 and 8, at step 435. The micro-controller then clears the address for the other sounds to prevent the storage device from playing the other sounds, allowing it to play only the third sound, at step 450. Then, the micro-controller calls up the play routine to play a routine using the third sound for the specified number of repeats, at step 465.

Once the play routine is called up by a respective sound during steps 455, 460 and 465, a random play routine using the respective sound and its number of repeats is initiated, at step 470. The random play routine plays the respective sound the instructed number of times having random delays between sounds. The process is discussed below with reference to FIG. 6. Once the random play routine is completed, the micro-controller then initiates a long random delay routine, which creates a randomly generated delay period following a random play routine, at step 475. The long random delay routine is discussed below with reference to FIG. 7. Once the long random delay routine is finished, the micro-controller returns to the beginning of the automatic program, at step 480 and starts the process again at step 400.

Figure 6:
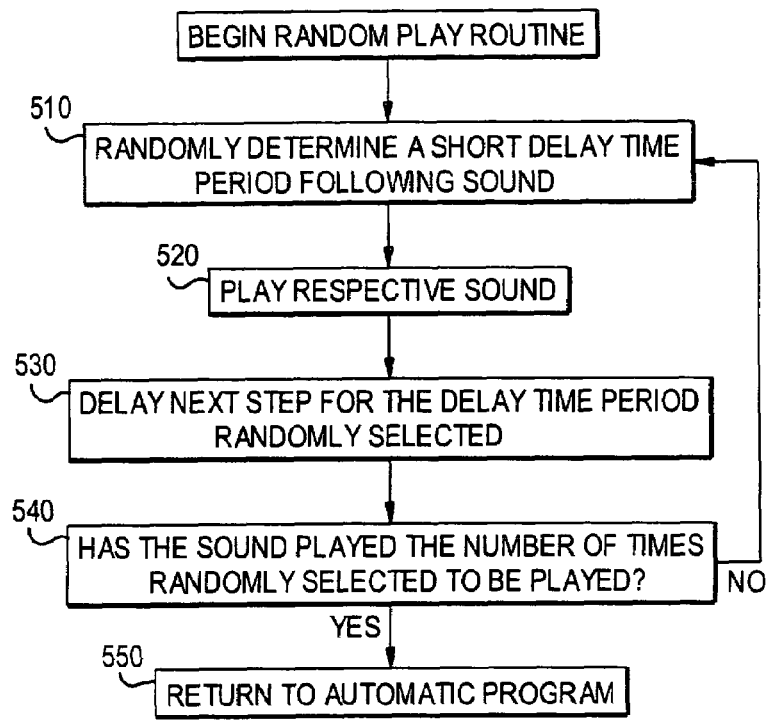
FIG. 6 is a sound playing sub-routine of the program shown in FIG. 4.

The random play routine is shown in FIG. 6, and begins by randomly selecting a short delay time to follow each sound play back, at step 510. The micro-controller then signals the storage device to play the respective sound, which is emitted from the speaker, at step 520. After the sound is played, the micro-controller creates a delay period in which it plays no sound for the randomly selected short delay time, at step 530. The micro-controller performs this short delay period by running through a multitude of processes, effectively keeping it busy. When the processes are finished, the short delay period is over. Following the short delay time, the micro-controller determines whether, during the present random play routine, whether the sound has been played the number of times randomly selected for the particular sound (selected at steps 425, 430 or 435 in the automatic program), at step 540. If the call device has not played the sound the randomly selected number of times, then the process returns back to step 510, and the process from there repeats, selecting a new random short delay time and replaying the sound. If the call device has played the sound the randomly selected number of times, then the process finishes the random play routine and returns to the automatic program, at step 550.

Figure 7:
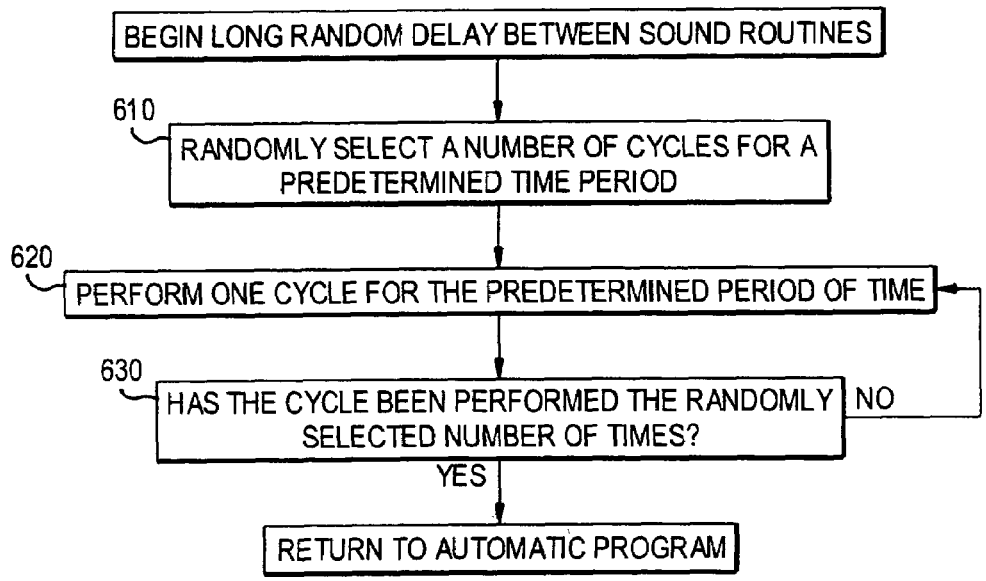
FIG. 7 is a delay sub-routine of the program shown in FIG. 4.

The long random delay routine is shown in FIG. 7, and begins by the micro-controller randomly selecting a number of times a time cycles is repeated, at step 610. Each time cycle represents a predetermined amount of time, and can range from fractions of a second to several minutes or hours. The micro-controller then performs one time cycle, at step 620. The time cycle is another delay period designed similar to the short delay period described above. When the time cycle is finished, the micro-controller then determines how many times it has performed the cycle, at step 630. If the micro-controller has not performed the time cycle the number of times randomly selected at 610, then the micro-controller returns back to step 620 and performs another time cycle. If the micro-controller has performed the time cycle the number of times randomly selected in step 610, then the process returns to step 480 of the automatic program.

The program described above is an example of a sound reproduction program that randomly selects a sound, randomly selects the number of times the sound is played in a sequence, randomly selects a short delay period between each pair of sounds, and randomly selects a long delay period between each sound sequence and a subsequently randomly selected sound sequence. The process has the advantage of creating a random sound pattern, while still having sufficient structure to provide a reasonable expectation of sound occurrences and regularity.

While a specific program is described above and included in the pseudo-code, there are many possible variations. The sound group can be any grouping of sounds, whether related or unrelated, whether an animal sounds or any other sound. Additionally, the program can be carried out using one sound or any plurality of sounds, three sounds was used herein as a reference. Furthermore, the particular order of the process is not determinative of the operation of the automatic program, other variations and processes can work just as well to provide the randomness of the program.

Although the present invention has been described and illustrated in detail to a specific tether design and structure, such explanation is to be clearly understood that the same is by way of illustration and example only, and is not to be taken by way of limitation. Other modifications of the above example may be made by those having ordinary skill in the art which remain within the scope of the invention. Thus, the spirit and scope of the present invention should be defined only by the terms of the claims.

APPENDIX I pseudo-code for the Automatic Program

:PIC Chip onboard resources Timer counter module
; Systems clock= 1 microsecond per instruction except for two word instructions = 2

APPENDIX I-continued pseudo-code for the Automatic Program

```
;microseconds (goto, and call)
;TMR is the PIC micro controllers on board timer counter module. By configuring the ;TMR as a
counter and setting the TMR to count instruction cycles. The TMR value will ;change on every
instruction. This allows the TMR to be used as a random number ;generator.
TMR = TIMER COUNTER MODULE
;Both COUNT and TIME registers are PIC micro controllers internal general purpose ;registers
COUNT0 = COUNTER REGISTER ZERO
COUNT1 = COUNTER REGISTER ONE
COUNT2 = COUNTER REGISTER TWO
COUNT3 = COUNTER REGISTER THREE
COUNT4 = COUNTER REGISTER FOUR
COUNT5 = COUNTER REGISTER FIVE
TIME1=TIME DELAY REGISTER ONE
TIME2=TIME DELAY REGISTER TWO
TIME3=TIME DELAY REGISTER THREE
WORK1=WORK1 REGISTER     ;WORK1 register is a general purpose
                         ;storage register
WORK2=WORK2 REGISTER     ;WORK2 register is a general purpose ;storage
                         register
;ADDRESS lines are I/O PINS CONFIGURED AS OUTPUTS. Connected to the ISD ;cound
chips address lines for addressing sounds (screams). On the "Screamer units" only ;two address
lines are used all other address lines on the ISD sound chip are tied low. ;More address lines
could be used to address additional sounds. But on the "Screamer ;units" only three sounds
(screams) are stored in the ISD sound chip.
ADDRESS1 = FIRST ADDRESS LINE
ADDRESS2 = SECOND ADDRESS LINE
;EOM End on message pin is an I/O pin configured as input pin. Ties to ISD sound chips
;RECLED pin. The ISD chip pulses RECLED low at the end of a played back addressed ;sound
"scream" The EOM pin is used to tell the PIC micro controller when the sound ;(scream) has
finished playing.
EOM= End of message pin
;PLAY message pin is an I/O pin configured as an output pin and connects to the ISD ;sound
chip's PLAYL pin. When PLAYL pin is placed active low, the ISD sound chip ;will play the
addressed sound "scream".
PLAY= PLAY MESSAGE LINE
;
SETUP  CONFIGURE TMR TO COUNTER INCRAMENT INSTRUCTION CYCLE
       CONFIGURE EOM TO INPUT
       CONFIGURE PLAY TO OUTPUT
       CONFIGURE ADDRESS1 TO OUTPUT
       CONFIGURE ADDRESS2 TO OUTPUT
;
;main uses the "random number" to determine which section of code (main main2, or main3)
and thus ;which pre stored sound to play. Main1 sets up the long time delays between sound
main MOVE TMR TO WORK1         ;save random number in WORK1
     AND WORK1 WITH h'0003'    ;and WORK1 with hex 3 to clear all except bits 0 & 1
     MOVE WORK1 TO WORK2       ;save random number in both WORK registers
     SUBTRACT WORK2 WITH 3     ;subtract 3 from WORK2
     IF WORK2 = 0, THEN GOTO main3
     MOVE WORK1 TO WORK2       ;restore the random number in WORK2
     SUBTRACT WORK2 WITH 1     ;subtract 1 from WORK2
     IF WORK2 = 0, THEN GOTO main2
; If the random number previously retrieved didn't = either 1 or 3 then this section of code is
executed. ;First a new "random number" is retrieved from TMR and saved in COUNT0. The 4
MSBs are masked by ;clearing them with and AND command and COUNT0 is incremented by 1
to insure at least 1 sound ;repeats
     MOVE TMR TO COUNT0        ;save random number in COUNT0
     AND COUNT0 WITH h'000f'   ;clear all BITS except bits BITS 0,1,2, & 3
     INCREMENT COUNT0 1        ;add 1 repeats to sound repeat
     CLEAR ADDRESS LINE1       ;clear both address lines to select address 00 The beginning
address
                               ; of the first sound
     CLEAR ADDRESS LINE2
     CALL PLAY                 ;call the play subroutine. After the called sub is finished
                               with its ;operation it will return to the next instruction after
                               the one that ;called it. In this case main1
;main1 sets up and generates the longer time delays between series of sounds have been play
main1 MOVE TMR TO COUNT4 ;retrieve a new "random number" and save it in COUNT4
     AND COUNT4 WITH h'0003'   ;And count4 with hex 3 to clear all except bits 0,1, and 2
     INCREMENT COUNT4 BY 1 ;Increment count4 by 1 to insure at lest 1 time delay
repeat
     GOTO count     ;Go to count to generate long time delay
main2 MOVE TMR TO COUNT0       ;save random number in COUNT0
     AND COUNT0 WITH h'000f'   ;clear all bits except bits 0,1,2, & 3
     INCREMENT COUNT0 BY 1     ;add 1 repeat to sound repeats
     SET ADDRESS LINE1    ;set ADDRESS line 1 and clear ADDRESS line2 the
address sound
```

APPENDIX I-continued pseudo-code for the Automatic Program

```
                        ; 01 or the second sound (scream) stored in the ISD sound
                          chip
    CLEAR ADDRESS LINE2
    CALL PLAY         ;call the play subroutine.
        GOTO main1          ;when PLAY is finished and returns go to main1 (long time
delay)
main3 MOVE TMR TO COUNT0        ;save random number in COUNT0
    AND COUNT0 WITH h'000f'     ;clear all BITS except bits BITS 0,1,2, & 3
    INCREMENT COUNT0 BY 1       ;add 1 repeat to sound repeats
    CLEAR ADDRESS LINE1         ;Clear ADDRESS line 1 and set ADDRESS line2 the
address sound
                        ; 10 or the third sound (scream) stored in the ISD sound
                          chip
    SET ADDRESS LINE2
    CALL PLAY                   ;call the play subroutine.
        GOTO main1              ; ;when PLAY is finished and returns go to main1 (long
time delay)
;
;play sets up the signals between the PIC micro controller and the ISD sound chip. play also
retrieves a ;random number and save it in COUNT5 which is used to determine the short time
delay between sounds ;(screams). COUNT0 which contains the "random number" saved in it by
which ever main section that ;called the play subroutine determines the number of times the
previously address sound is repeated. ;COUNT1'COUNT2, and COUNT3 are set up as a time
out incase the ISD sound chip never send the ;EOM (End Of Message) signal.
play MOVE TMR TO COUNT5 ;Retrieve new "Random number" and save in COUNT5
    AND COUNT5 WITH h'000f'     ;clear all except bits 0,1,2, & 3
    INCREMENT COUNT5 BY 1       ;insure at least 1 short time delay repeat
    CLEAR PLAY   ;make the PLAY pin active low to start the ISD playing the
                      addressed ;sound(scream)
        COUNT3 = 6
s3    COUNT2 =256
s2    COUNT1=256
s1  IF EOM = 0 THEN GOTO s0        ;if EOM is active low meaning message complete
go to s0
        DECREMENT COUNT1 by 1, skip next instruction if results = 0
        GOTO s1
        DECREMENT COUNT2 by 1, skip next instruction if results = 0
        GOTO s2
        DECREMENT COUNT3 by 1, skip next instruction if results = 0
        GOTO s3
s0   SET PLAY           ;Make PLAY inactive high. Disabling the play1 pin on the ISD
sound chip
st   CALL sec1b         ; call .01152 second time delay
        DECREMENT COUNT5 by 1, skip next instruction if results = 0
        GOTO st         ; this loop determines the short time between sounds via the
                          "random ;number" stored in COUNT5 every loop = .01152
                          seconds
        DECREMENT COUNT0 by 1, skip next instruction if results = 0
        GOTO play       ;This loop determines the number of times a sound repeats via the
                          ;"Random ;number" stored in COUNT0
        RETURN          ;When COUNT0 = 0 return to calling routine
;
;
;
;count sub is used for longer time delays between sounds. Each time the random number in
COUNT4 ;repeats this subroutine 7.86432 seconds is added to the time delay
count    COUNT3 = 30
c2       COUNT2 = 256
c1       COUNT1 = 256
c0       NO OP          ;No operation instruction adds 1 microsecond to loop
        DECREMENT COUNT1 by 1, skip next instruction if result = 0
        GOTO c0
        DECREMENT COUNT2 by 1, skip next instruction if result = 0
        GOTO c1
        DECREMENT COUNT3 by 1, skip next instruction if result = 0
        GOTO c2
        DECREMENT COUNT4 by 1, skip next instruction if result = 0 ;COUNT4 contains
        the random
                                ;number thus generating a
                                random ;"long" time delay
                                determined by ;COUNT4
        GOTO count
        GOTO main       ;when COUNT1,COUNT2,COUNT3, and COUNT4 = ZERO go
to main
;
;
; .01152 second delay
```

APPENDIX I-continued pseudo-code for the Automatic Program

```
sec1b TIME 2 =16        ;LOAD 16 into TIME 2
t1ba2 TIME 1 = 256      ;LOAD 256 into TIME 1
t1bba DECREMENT TIME1 by 1, skip next instruction if results
      GOTO t1bba        ;Loop until TIME 1 = 0
      DECREMENT TIME2 by 1, skip next instruction if results = 0
      GOTO t1ba2        ;Loop until TIME 1 , AND TIME2 = 0
      RETURN            ;When TIME 1, AND TIME 2 = ZERO RETURN
END
```

I claim:

1. A process for controlling the operation of a call device having a housing, a speaker mounted inside the housing, a storage device having at least one sound recording recorded therein, and a control device operable to cause the storage device to play a sound through the speaker, said process comprising the following steps:
   a) selecting one of said at least one sound recording to be played by the call device,
   b) selecting a number of times the selected sound recording will be repeated to form a sequence of the selected sound recording,
   c) randomly selecting a length of time to occur following a playing of the selected sound recording,
   d) playing the selected sound recording,
   e) delaying the next step for the selected length of time, and
   f) repeating steps (c)–(e) for the number of times the selected sound recording is to be repeated.

2. The process as described in claim 1, wherein the step of selecting the number of repeats comprises randomly selecting the number of times the selected sound recording will repeat.

3. The process as described in claim 1, wherein the storage device has a plurality of sound recordings recorded therein.

4. The process as described in claim 3, wherein the step of selecting one of said at least one sound recording comprises randomly selecting a sound recording from the plurality of sound recordings.

5. The process as described in claim 4, wherein steps (a)–(f) are continuously repeated during an automatic mode of the call device.

6. The process as described in claim 5, further including randomly varying the time between each successive repeat of steps (a)–(f).

7. The process as described in claim 4, wherein the step of selecting the number of repeats comprises randomly selecting the number of times the selected sound recording will repeat.

8. A call device comprising:
   a housing,
   a speaker attached within the housing,
   a storage device containing at least one sound recording, and
   a controller operable to cause the storage device to play one of said at least one sound recording through the speaker,
   wherein the controller operates according to a program and upon selection of one of the at least one sound recording, the controller selects a number of times the sound will repeat, causes the storage device to play a sequence of the selected sound including the playing the selected sound recording a first time and repeatedly playing the selected sound recording the selected number of times, and randomly varies a length of time between each successive playing of the selected sound recording in the sequence.

9. The call device as described in claim 8, wherein the storage device is an analog storage device.

10. The call device as describe in claim 8, wherein the controller randomly selects the number of times the selected sound recording will play in the sequence.

11. The call device as described in claim 8, wherein the storage device contains a plurality of sound recordings.

12. The call device as described in claim 11, wherein the controller randomly selects from between the plurality of sound recordings which sound recording will be played in a sequence.

13. The call device as describe in claim 12, wherein the controller performs a plurality of sequences and the sound recording for each sequence is randomly selected from the plurality of sound recordings.

14. The call device as described in claim 12, wherein the controller randomly varies a length of time between each successive sequence of sound recordings.

15. The call device as described in claim 8, further including a mode selection switch having a first condition that causes the controller to operate according to the program and a second condition that causes the controller to produce one of said at least one sound recording.

16. The call device as described in claim 15, further including a sound selection switch operable to select a single sound recording or a group of sound recordings.

17. A process for controlling the operation of a call device in an automatic mode, the call device having a housing, a speaker mounted inside the housing, a storage device having a plurality of sound recordings recorded therein, an a control device operable to cause the storage device to play said sound recordings through the speaker, said process comprising the following steps:
   a) randomly selecting one of said at least one sound recording to be played by the call device,
   b) randomly selecting a number of times the selected sound recording will be repeated to form a sequence of the selected sound recording,
   c) randomly selecting a short length of time to occur following a playing of the selected sound recording,
   d) playing the selected sound recording,
   e) delaying the next step for the selected short length of time,
   f) repeating steps (c)–(e) for the number of times the selected sound recording is to be repeated
   g) randomly determining a long length of time to occur after playing the sequence and delaying the next step for the long length of time, and
   h) repeating steps (a)–(g) during the operation of the call device in the automatic mode.

* * * * *